(12) United States Patent
Mourlevat et al.

(10) Patent No.: US 6,400,786 B1
(45) Date of Patent: Jun. 4, 2002

(54) PROCESS AND DEVICE FOR MONITORING AT LEAST ONE OPERATING PARAMETER OF THE CORE OF A NUCLEAR REACTOR

(75) Inventors: Jean-Lucien Mourlevat, Noisy le Roi; Monique Lovedec, Paris, both of (FR)

(73) Assignee: Framatome, Courbevoie (FR)

( * ) Notice: Subject to any disclaimer, the term of this patent is extended or adjusted under 35 U.S.C. 154(b) by 2 days.

(21) Appl. No.: 09/607,949

(22) Filed: Jun. 30, 2000

(30) Foreign Application Priority Data

Jul. 5, 1999 (FR) .......................................... 99 08655

(51) Int. Cl.$^7$ .............................................. G21C 17/00
(52) U.S. Cl. ........................ 376/254; 376/255; 376/241
(58) Field of Search ................................ 376/254, 255, 376/241, 277, 249, 215, 216, 217; 976/DIG. 238

(56) References Cited

U.S. PATENT DOCUMENTS 4,637,910 A * 1/1987 Impink, Jr. ................. 376/216
4,801,551 A * 1/1989 Byers et al. ................. 436/133
5,024,801 A * 6/1991 Impink, Jr. et al. ......... 376/217
5,406,598 A   4/1995 Takeuchi et al.

FOREIGN PATENT DOCUMENTS

| DE | 24 32 566 | 1/1975 |
| EP | 0 323 280 | 7/1989 |
| EP | 0 396 321 | 11/1990 |

* cited by examiner

*Primary Examiner*—Galen L. Barefoot
(74) *Attorney, Agent, or Firm*—Connolly Bove Lodge & Hutz LLP (57) ABSTRACT

During operation of the nuclear reactor, at specified time intervals, a neutron flux is measured using a set of neutron flux detectors which are fixed and arranged in the core (1) of the nuclear reactor, the maximum number n of detectors (8) being 15% of the number of fuel assemblies in the core. The measured signals are processed and the instantaneous distribution of neutron flux or of power throughout the entire core (1) is calculated from the measured signals. At least one core operating parameter is calculated from the instantaneous neutron flux distribution and an alarm is raised if at least one parameter exceeds a set range.

12 Claims, 3 Drawing Sheets

PROCESS AND DEVICE FOR MONITORING AT LEAST ONE OPERATING PARAMETER OF THE CORE OF A NUCLEAR REACTOR

FIELD OF THE INVENTION

The invention relates to a process and device for monitoring at least one operating parameter of the core of a nuclear reactor, in particular a pressurized water nuclear reactor.

BACKGROUND OF THE INVENTION

Nuclear reactors such as pressurized water nuclear reactors have a core made up of juxtaposed fuel assemblies which are generally of straight prismatic shape with their longitudinal axes in the vertical direction, that is along the height of the core.

During operation of the nuclear reactor, it is necessary to make sure that the reactor operates permanently under perfect conditions and in compliance with the general conditions of safety set by regulations and standards.

In particular, it is necessary to determine whether the bulk production and distribution of the neutron flux as well as the bulk distribution of the power released in the core comply with normal and satisfactory operating conditions of the core.

In order to do this, operating parameters of the nuclear reactor core, such as the bulk power distribution in the core, the neutron flux shape factors or even the critical heating ratio, need to be calculated. These parameters are determined from neutron flux measurements in the core which enable the neutron flux distribution throughout the entire core to be determined in three dimensions.

The parameters which are characteristic of the core state under normal operation and which are determined from the neutron flux measurements must not at any time exceed limits determined during design studies of the nuclear reactor.

When a limiting value is exceeded by one of the parameters which are characteristic of core operation, detection of this must raise an alarm and various measures relating to running of the nuclear reactor must be taken.

To monitor the nuclear reactor core operation efficiently, it is necessary to determine the core operating parameters and therefore the neutron flux distribution in the core, in as brief a time as possible.

Neutron flux measurements in the core needed for continuous monitoring of the nuclear reactor in operation are generally carried out by chambers located outside the reactor vessel and are generally designated as "ex-core" chambers.

These chambers, which have several (for example six) measurement stages over the height of the core, are generally arranged to carry out measurements in four zones on the periphery of the nuclear reactor core and are located symmetrically with respect to two planes of axial symmetry of the core which make an angle of 90° between them.

The staged chambers of the ex-core detectors enable flux measurements to be obtained at various levels over the height of the core and in the four zones distributed, around the core, in the circumferential direction. However, these external devices only provide approximate values of the neutron flux inside the core and a rough representation of the neutron flux distribution. As a result, the monitoring parameters obtained lack accuracy and, for safety, greater margins must be provided for the critical values of those parameters which must not be reached or exceeded.

To obtain a more accurate representation of the neutron flux distribution in the core, additional neutron flux measurements are carried out inside the core, at regular but relatively long time intervals, for example of the order of one month, using very small measurement probes, called "in-core" probes, which generally consist of fission chambers. The in-core probes are all attached to the end of a cable, called a teleflex cable, which is flexible to ensure that it moves inside a measurement channel of the nuclear reactor instrumentation. Each of the measurement channels comes out at one of its ends into an instrumentation room located at the bottom of the reactor building. The movement of the fission probes in the measurement channels are checked from the instrumentation room. Each measurement channel has, inside the nuclear reactor core, an instrumentation tube of a fuel assembly and a thimble placed inside the instrumentation tube, in which the fission probe moves around. Neutron flux measurements are carried out in a set of fuel assemblies distributed throughout the core cross section.

For example, in a core containing 177 fuel assemblies, there are generally 56 measurement channels. Similarly, there are 58 measurement channels for a core of 193 fuel assemblies, 50 measurement channels for a core of 157 fuel assemblies and 60 measurement channels for a core of 205 fuel assemblies. The neutron flux measurements are carried out while the in-core probes are slowly moved over the entire height of the core. Thus, neutron flux can be measured. at several points, over the height of the core, with a small spacing. Furthermore, given the distribution of instrumented fuel assemblies within the core and the core symmetries, an image which is sufficiently representative of the neutron flux is obtained in the form of a flux map. However, the in-core probes consisting of fission chambers cannot be used for extended periods inside the nuclear reactor core. The accurate determination of the core flux map can only be carried out periodically and therefore cannot be used for continuously monitoring the operation of the nuclear reactor core.

On the other hand, neutron flux measuring probes, which can be positioned and maintained inside the core of a nuclear reactor permanently while the nuclear reactor is in operation, are known. Such neutron flux measuring probes which can be made in the form of "self-powered neutron detectors", are generally assembled in the form of measuring rods in a vertically aligned arrangement with a constant spacing between two successive probes, to make up the flux measuring detectors over-the entire height of the nuclear reactor core. Each of these rods is introduced into a thimble usually allocated to measurements by mobile probe, which is itself inserted into the instrumentation tube of a fuel assembly. Each of the flux measurement detectors or measuring rods whose length is more or less equal to the height of the core may have, for example, eight measuring probes consisting of self-powered neutron detectors.

It has been proposed, for a nuclear reactor core containing 177 fuel assemblies, to arrange 52 detectors or measuring rods in 52 instrumented assemblies of the nuclear reactor core distributed over the cross section of the core.

Such an instrumentation system, which has 8×52 measurement points distributed throughout the core, is capable of providing an image of the flux distribution in the. nuclear reactor core in 3 dimensions, with high accuracy.

However the processing of neutron measurements which is carried out by the instrumentation kept permanently in the core during the nuclear reactor operation requires an execution time which can be long, in comparison will the response time needed for monitoring the nuclear reactor core, which makes its use implausible for monitoring core operating parameters.

A process which enables the bulk flux distribution and, from this distribution, the reactor core monitoring parameters to be obtained, both accurately and quickly, is not known.

Generally, nuclear power stations have several power units, each unit consisting of a nuclear reactor located in a reactor building and a conventional part for electricity generation. In this case, the monitoring relates to the nuclear reactors of each power unit.

BRIEF DESCRIPTION OF THE INVENTION

The purpose of the invention is therefore to propose a monitoring process for at least one operating parameter of the core of a nuclear reactor of a power unit in a nuclear power station, made up of a number of juxtaposed fuel assemblies arranged over the height of the core, by using a set of detectors for measuring neutron flux introduced into at least some of the fuel assemblies of the core, each set comprising a number of probes for measuring neutron flux which are distributed over the height of the core, this process enabling a fast and accurate determination of the flux distribution in the core and of at least one operating parameter of the core to be obtained from this distribution.

For this purpose, during operation of the nuclear reactor, at specified time intervals:
  the neutron flux bulk distribution is measured, using the set of neutron flux detectors, the maximum number n of detectors being equal to 15% of the number of fuel assemblies in the core,
  a neutron flux calculation code is used and measurements provided by the set of neutron flux detectors are taken into account to obtain the instantaneous neutron flux bulk distribution throughout the entire core, in the form of a set of neutron flux values at points distributed throughout the core,
  at least one core operating parameter is calculated from the instantaneous neutron flux bulk distribution and,
  an alarm is raised if at least one operating parameter is outside the set range.

According to a first embodiment of the invention, to obtain the instantaneous distribution of the neutron flux throughout the entire core:
  an instantaneous calculation is carried out, on the reactor site, of the bulk flux distribution inside the core, at the various points distributed throughout the core comprising a first sub-set of instrumented positions where the neutron flux measuring probes are located and a second sub-set of non-instrumented positions, from parameters originating from the power unit plant, using the neutron flux calculation code,
  the differences between the flux values obtained by measurement and the corresponding values calculated from the parameters originating from the power unit plant are calculated for each instrumented position,
  the corresponding differences for every non-instrumented position in the core are calculated from the differences relating to the instrumented positions, by an extrapolation procedure,
  the values of the said differences are added algebraically to the bulk flux distribution values obtained from the parameters originating from the power unit plant, to obtain the measured value of the bulk flux distribution for every point distributed throughout the core.

According to a second embodiment of the invention, to obtain the instantaneous neutron flux distribution throughout the core:
  a first instantaneous calculation is carried out, on the reactor site, of the neutron flux bulk distribution inside the core in the form of a set of neutron flux values at the various points distributed throughout the core, comprising a set of instrumented positions in which the neutron flux measurement probes are located, from parameters originating from the power unit plant, using the neutron flux calculation code,
  the differences between the neutron flux values obtained by measurement and the corresponding values calculated from the parameters originating from the power unit plant are calculated for every instrumented position,
  the calculated differences are used to correct the defining parameters of the neutron flux calculation code, and
  a second instantaneous calculation is carried out, on the nuclear reactor site, of the instantaneous neutron flux distribution inside the core, from the parameters originating from the power unit plant, using the neutron flux calculation code which includes corrected defining parameters.

In order to make the invention clearly understood, the implementation of the process according to the invention for the monitoring of a pressurized water nuclear reactor core and a device enabling this monitoring to be carried out will now be described, with reference to the appended figures.

DETAILED DESCRIPTION OF THE INVENTION

Figure 1:
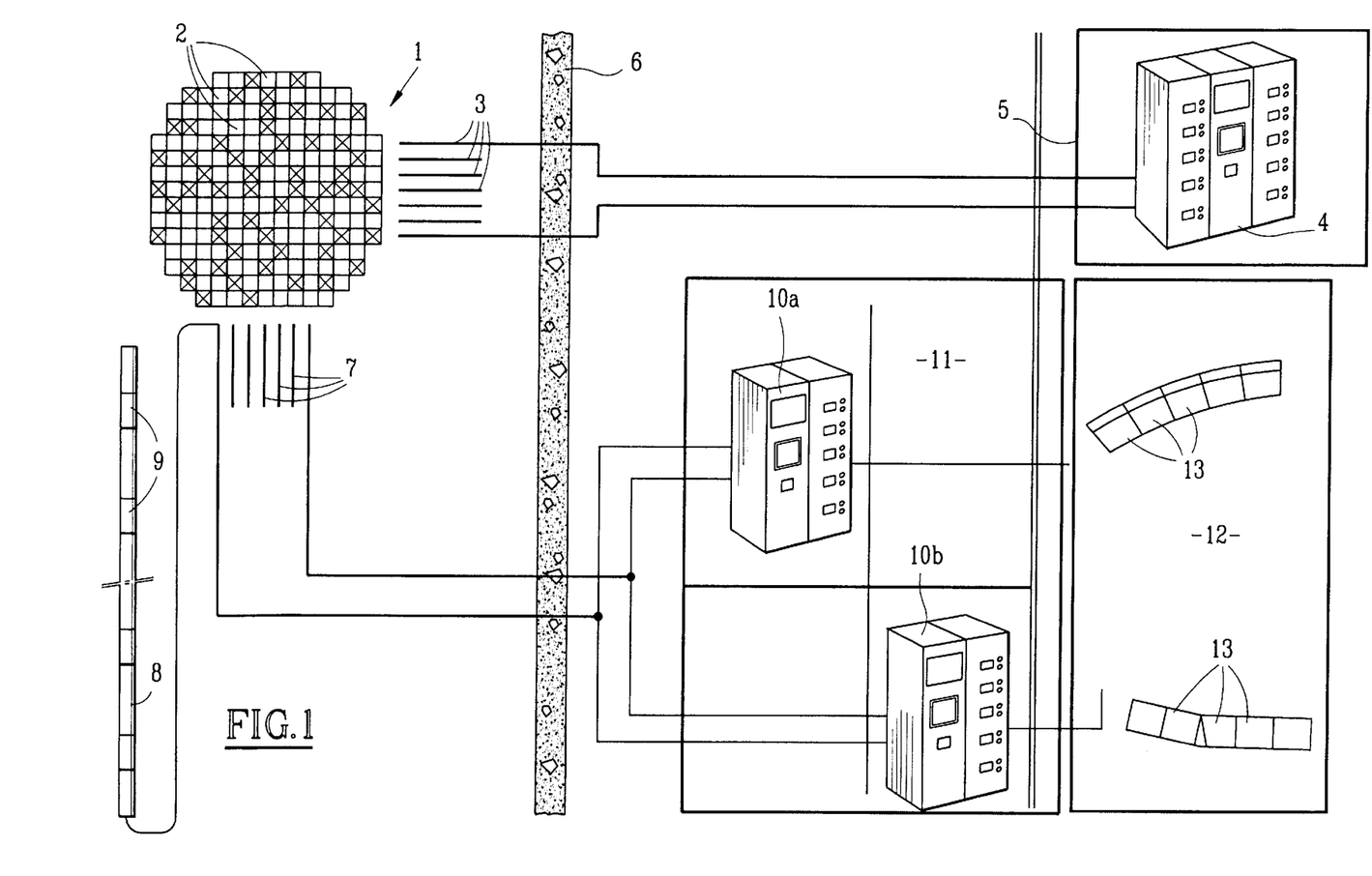
FIG. 1 is a schematic general view of a cross section of the core of a nuclear reactor and means for the acquisition and processing of measurements as well as means for monitoring the nuclear reactor, according to the invention.

FIG. 1 shows the transverse horizontal section of the core 1 of a pressurized water nuclear reactor consisting of juxtaposed fuel assemblies 2 of straight prismatic shape with a square base, placed so that their axial or longitudinal direction is vertical, that is to say directed along the height of the core 1.

Inside the core, which comprises 193 fuel assemblies, some of the fuel assemblies marked by. a cross are instrumented fuel assemblies, that is to say fuel assemblies whose instrumentation tube is able to take a thimble which in turn can take a mobile probe or a stationary detector for measuring neutron flux.

Out of the 193 assemblies in the core, 58 assemblies are instrumented assemblies which are distributed throughout the core cross section.

Of the 58 core instrumentation measuring channels, 42 channels, shown as a entire by the reference number 3, are connected to a computer 4, inside the computer room 5 of the nuclear power station, the said room being outside the reactor building in which is located the vessel containing the core 1 which is bounded by the safety containment 6. The computer 4 is the computer for the internal core instrumentation, which is generally denoted by the abbreviation RIC (reactor in-core). The RIC is used to carry out at regular intervals, for example every month, a neutron flux measurement in the core measurement channels using the mobile probes. In this way a flux map is made with reasonable accuracy. However, the RIC cannot be used to carry out continuous monitoring of the nuclear reactor core operation. The RIC comprises mobile measurement probes which are moved in the measurement channels.

According to the invention, 16 neutron flux measuring channels, denoted generally by the reference number 7, from the 58 channels fitted with a thimble located inside the fuel assembly instrumentation tube forming the end of the measurement channel and extending over the entire height of the core, take a neutron flux detector which is kept permanently in the core during operation of the nuclear reactor.

Each of the neutron flux detectors introduced in the end part of a measurement channel 7, inside the core 1 of the nuclear reactor, consists of a set of 8 self-powered neutron detectors which are fixed to the measurement rod in locations spaced apart over the length of the measurement rod so as to be distributed evenly over the entire height of the core.

On the left of FIG. 1 is shown, schematically and on an enlarged scale, the measurement rod 8 of one of the measurement channels 7, which rod comprises eight self-powered neutron detectors 9 distributed along the length of the measurement rod or detector 8.

The self-powered neutron detectors 9 are preferably self-powered neutron detectors whose transmitter is made of rhodium, so that under the effect of neutron radiation inside the core 1 of the nuclear reactor the self-powered neutron detectors produce an electrical signal which can be quickly used to provide an accurate measurement of the neutron flux, as will be explained hereinafter.

The 16 measurement channels 7, enabling the process according to the invention to be implemented, are connected, on the outside of the reactor building bounded by the safety containment 6, via four conditioning units 15, to two cabinets 10a and 10b located in two protection rooms 11 of the nuclear power station. The four conditioning units are located in four separate protection rooms. Each of the cabinets 10a and 10b contains at least one unit for processing the neutron flux measurement signals and one unit for the acquisition of monitoring parameters from the nuclear reactor.

The processing units of the cabinets 10a and 10b of the protection room enable various parameters for monitoring the nuclear reactor core operation to be provided, as will be explained in the rest of the text. The operating parameters are compared with limiting values, in order to determine if the parameters lie inside or outside a range corresponding to normal operation of the nuclear reactor core.

The processing and acquisition units of the cabinets 10a and 10b are connected, inside the control room 12 of the nuclear reactor, to display panels or screens 13 which enable an alarm to be raised should a limiting value be exceeded by an operating parameter and which enable the parameters useful in the operation and monitoring of the nuclear reactor to be displayed.

Figure 2:
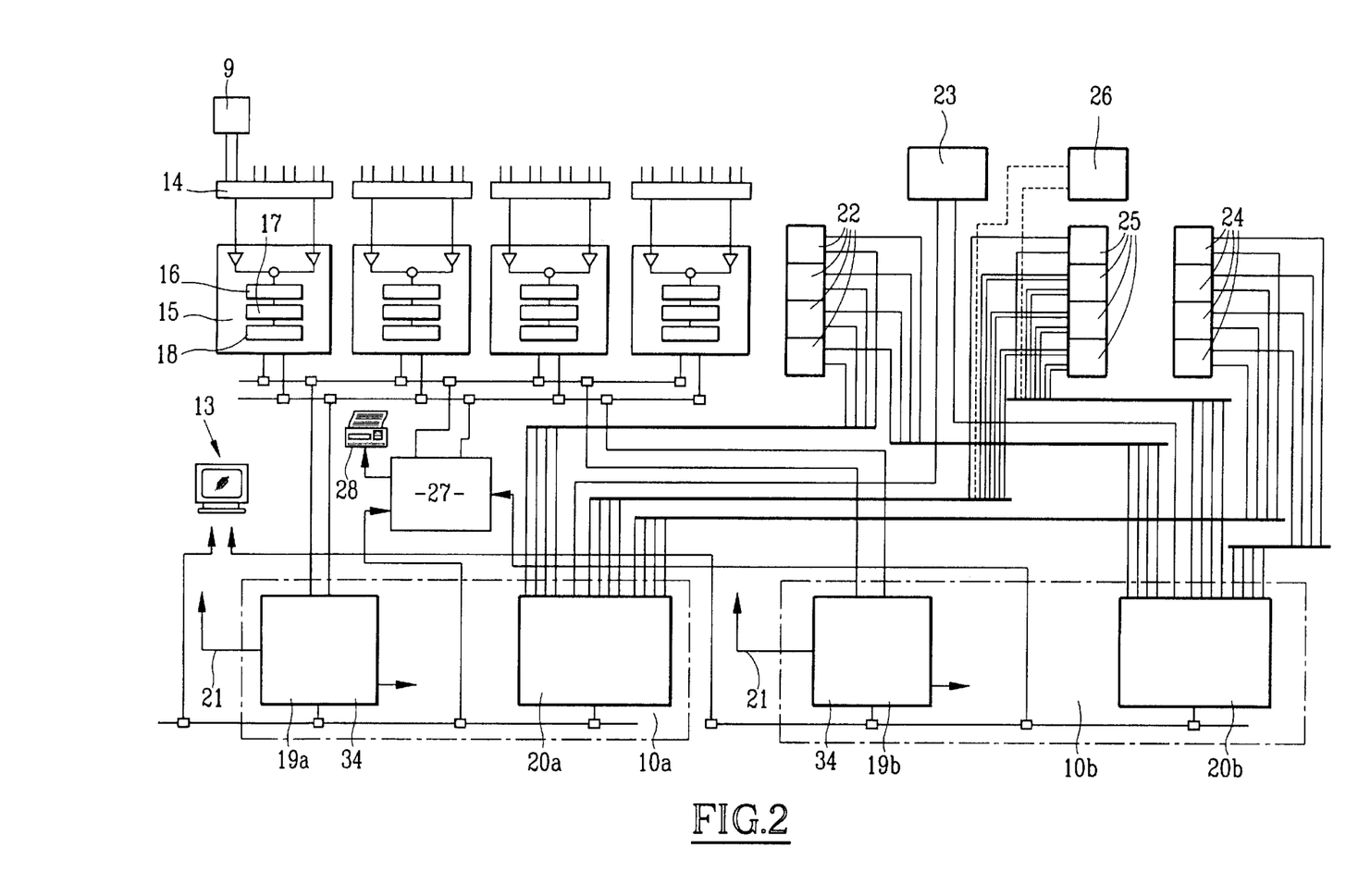
FIG. 2 is a schematic view of the means for the acquisition and processing of the measurements used for monitoring the nuclear reactor.

As can be seen on FIG. 2, each of the self-powered neutron detector rods 9 is connected to a signal conditioning unit 15, via a connection element 14. The plant comprises four connection elements 14, to each of which the self-powered neutron detectors of four measurement channels 7 are connected.

Each of the connection elements 14 of the self-powered neutron detectors 9 is connected to one of the self-powered neutron detectors by a measurement wire and a control wire. The useful measurement signal is obtained, inside the corresponding conditioning unit 15, by subtraction of the signals provided by the measurement wire and the control wire. The measurement signal is transmitted, inside the corresponding conditioning unit 15, to an analogue filter 16 which enables the signal to be filtered and then transmitted to an analogue-to-digital conversion unit 17 in order to digitize the signal. The digitized signal is itself transmitted to a unit 18 which enables on-line acceleration processing of the flux measurements to be carried out.

So, the self-powered neutron detector response, when it is subjected to a neutron flux and gamma radiation inside the core of the nuclear reactor, is produced from three components:

two components of the response signal are due to electron production processes and therefore to the creation of an electric current, by radioactive beta disintegration, one of the processes having a half-life of 60 seconds and the other process having a half-life of about 4 minutes, for a rhodium self-powered neutron detector, an electron creation process by the Compton effect due to the secondary emission of gamma rays resulting from neutron capture and from irradiation by the gamma rays coming from the core, the response time of the self-powered neutron detector, that is to say the production of current by formation of electrons being very short and virtually instantaneous.

The transfer function, which enables the electron emission and therefore the current produced as a function of neutron flux received by the self-powered neutron detector to be determined, is known. It is known how to isolate the component due to the Compton effect from the electric current produced. By using the inverse function of the transfer function or some other mathematical process, it is then possible to determine the neutron flux from the current generated only by the fast component. This procedure, carried out in the electronic processing units 18, which are part of the conditioning units 15, allows the response of the self-powered neutron detectors to be speeded up for determination of the neutron flux.

This processing, which is called on-line inversion, enables the response time of the self-powered neutron detectors to be reduced from a time of around two minutes to one of around a few seconds.

The accelerated current signal is transmitted to the processing units 19a and 19b fitted in the cabinets 10a and 10b of the protection room.

The use of two identical cabinets 10a and 10b, each containing a processing unit 19a or 19b and a parameter acquisition unit 20a or 20b, enables the safety of the monitoring plant, which can continue to operate when one of the processing or acquisition units has become unavailable, to be increased.

As will be explained hereinafter with regard to FIG. 3, the digitized signals from the neutron flux measurements are taken into account for determining, in the processing units, the neutron flux bulk distribution in the core in the form of a set of flux values at points distributed throughout the core, for example, in the case of a core containing 193 fuel assemblies at N points distributed along the instrumentation channels of each fuel assembly, that is to say 193×N points, N being determined according to the desired accuracy.

From the flux or power distribution in the core, the processing unit determines operating parameters of the nuclear reactor core and in particular the parameters defined below:

$P_{lin}$: linear power density, that is to say the power per unit length the fuel elements of the core, CHR or DNB ratio: critical heating ratio defining the differences of thermal exchange conditions for the fuel elements, with respect to a critical boiling situation, $PI_{ax}$: axial power imbalance in the core, $PI_{az}$: azimuthal power imbalance in the core, NRM: negative reactivity margin.

The core operating parameters are compared with limiting values defined during design of the nuclear reactor. This comparison enables margins to be defined with respect to the limiting values and, should a limiting value be exceeded, enables an alarm signal to be provided, which is transmitted to a display means 13 in the control room 12 of the nuclear reactor.

The various calculated parameters, the flux distribution or even the calculated margins can also be displayed permanently on one or several screens 13 in the control room 12.

The process according to the invention is characterized by the use of a reduced number of detectors, placed at fixed distances, for carrying out neutron measurements and for determining the flux and power distribution in the core.

For example, in the case of the embodiment described, 16 detectors, each comprising eight self-powered neutron detectors distributed over the height of the core, are used to determine the flux and power distribution in the core of a nuclear reactor containing 193 fuel assemblies.

In the case. of a core containing 193 fuel assemblies, the use of in-core mobile instrumentation capable of examining 58 assemblies such as those shown in FIG. 1 using mobile probes introduced periodically into the nuclear reactor core is known. This instrumentation acts as the reference instrumentation. Within the framework of the invention only 42 channels are used for the mobile instrumentation.

In the case of in-core instrumentation, which would contains 58 detectors placed permanently in the core, and which would be used to monitor the nuclear reactor, the processing time to obtain the flux and power distribution in the core and the margin and alarm signals and various processing parameters of the core would be of the order of several minutes. Such a processing time is far too long for the monitoring tasks to be carried out satisfactorily.

In the case of the monitoring process and device according to the invention, only 16 detectors distributed inside the core are used and in this case, the processing time is close to 30 seconds. Thus, a far more effective monitoring of the nuclear reactor core operation can be carried out. Furthermore, the use of suitable software in the processing units taking into account the accurate periodic readings of the flux values at certain points in the core from the fixed detectors enable the instantaneous flux and power distribution in the nuclear reactor core to be determined with great accuracy. The values of the core operating parameters provided by the processing units are therefore totally representative of the instantaneous state of the core.

The flux distribution calculation is carried out using a neutron calculation software (or code) adapted to the reduced number of measurement detectors.

The frequency of measurements and calculations leading to a value of core operating parameter or parameters being obtained, may be close to thirty seconds.

It has been possible to determine that the maximum number of measurement detectors that can be used to implement the process according to the invention is close to 15% of the number of fuel assemblies. In other words, for a core containing close to 200 fuel assemblies, the maximum number of flux measurement detectors in a fixed position in the core is 30.

As can be seen on FIG. 2, the results of calculations carried out in the processing units 19a and 19b are transmitted via a line 21 to a general control system of the nuclear power station denoted by the term controbloc.

The acquisition units 20a and 20b enable the instantaneous values of several parameters, called parameters originating from the nuclear power station power unit plant, to be received in and transmitted to the control room.

Units 22 called digital variable transfer units (DVTUs) enable data such as the temperatures and pressures in the primary circuit loops of the nuclear reactor and the power level defined by the thermohydraulic conditions to be transferred to the acquisition units.

A unit 23 which is called the rod position processing logic (RPPL) enables the nuclear reactor reactivity parameters concerning the position of the various rod cluster control assemblies to be transmitted to the acquisition units.

Units 24, which are called the RPN units or core instrumentation units, enable the value of the average core neutron power to be provided.

Measurement units 25 (KRG units) enable the core output temperature values to be provided. Finally, a unit 26 comprises a unit for measuring the boron content of the cooling water of the nuclear reactor.

The processing of parameters originating from the power unit plant in the processing unit (or computer) will be described hereinafter with respect to FIG. 3.

The parameters originating from the power unit plant and the operating parameters from the acquisition and processing units as well as the flux measurements are transmitted to a local archiving system (LAS) 27 connected to a printer 28.

Figure 3:
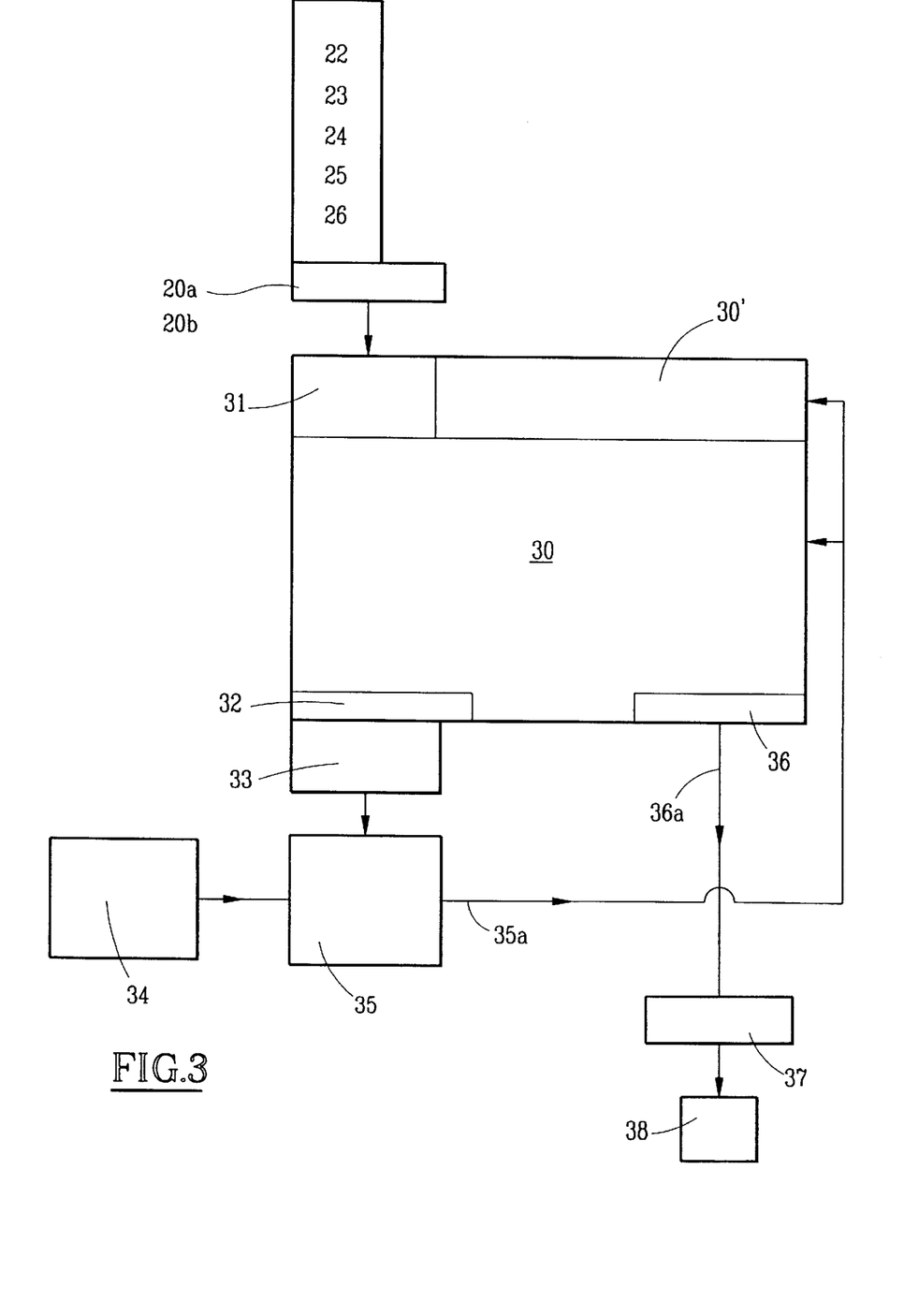
FIG. 3 is a block diagram showing the implementation of the monitoring process according to the invention.

FIG. 3 is a block diagram showing the three-dimensional neutron model 30, which allows an on-line calculation to be carried out, that is to say an instantaneous calculation, on the actual site of the nuclear reactor, of the neutron flux distribution in the core of the nuclear reactor and the core operating parameters such as the $P_{lin}$, CHR or DNB ratio, $PI_{ax}$, $PI_{az}$ and NRM parameters, mentioned hereinbefore.

The three-dimensional neutron model 30 is used in the form of software which is installed in a computer on the nuclear reactor site and which allows the bulk neutron distribution in the core to be determined, in the form of a set of neutron flux values at various points distributed throughout the volume of the nuclear reactor core 1.

For example, for a nuclear reactor having a core made up of 193 fuel assemblies arranged side by side, the neutron flux calculation is carried out at eight points of the central instrumentation tube of each fuel assembly, distributed evenly over the height of the nuclear reactor core.

The neutron flux bulk distribution in the nuclear reactor core therefore consists of a set of 193×N neutron flux values, each one associated with a position of a point in the nuclear reactor core, N being chosen according to the required accuracy.

Of the 193×N points distributed in the core, 16×8 points correspond to positions in which the neutron flux measuring probes, forming the set of probes used within the framework of the monitoring process of the invention are arranged. The corresponding positions are denoted as instrumented positions, the 193×N−16×8 remaining positions being denoted as non-instrumented positions.

The computer on which the neutron model 30 is used to carry out neutron flux calculations receives as input data, in an input module 31, the parameters originating from the nuclear reactor power unit plant, via the acquisition units 20a and 20b.

The various parameters originating from the power unit plant which were mentioned hereinbefore have been represented by the references 22, 23, 24, 25 and 26 of the measurement and processing units enabling the parameters to be supplied to the acquisition units 20a and 20b.

The neutron model 30, based on the neutron flux calculation code at any point in the core, is parameterized by input into the calculation code, at the module 30', of defining parameters such as the nuclear fuel characteristics associated with enrichment in the core and the xenon concentration in the core.

The calculated neutron flux values, shown at 32 in FIG. 3, are transmitted to a unit 33 for selecting flux values calculated at each of the 16×8 instrumented positions.

The values selected by the unit 33 are transmitted to a comparison module 35 which also receives the neutron flux measurements carried out by the self-powered neutron detectors and formatted in the corresponding conditioning units.

The entire acquisition and conditioning means for neutron flux measurement signals have been shown as the module 34.

The 16×8 measured neutron flux values are compared with the 16×8 calculated values, inside the comparison module 35 in which the differences between the calculated values and the measured values are calculated for all the instrumented positions.

The results of the comparison, in the form of calculated differences, is transmitted via the line 35a to the computer using the calculation code based on the three-dimensional neutron model 30.

Two modes for processing the differences can be used.

In the first processing mode, the differences calculated for each instrumented position are processed by the computer which determines, by an extrapolation procedure, the corresponding values of the differences for each of the non-instrumented positions.

For the set of points distributed throughout the core corresponding to the instrumented positions or to the non-instrumented positions, the values of the said differences are added algebraically to the flux values obtained by the calculation based on the parameters originating from the power unit plant, so as to obtain the measured value of the flux distribution at all the points in the core.

From these measured values, at least one operating parameter mentioned hereinbefore is calculated in a module 36. The operating parameter is transmitted via the line 36a to a comparison unit 37 which transmits a control signal for an alarm device 38, should there be a significant difference between the value of the monitored parameter and a set value.

According to a second processing mode, the values of the differences are transmitted to the module 30', so as to modify the defining parameters of the calculation code, in a way that the difference between the measured and calculated values are minimized, at every point corresponding to an instrumented position.

Determining the way in which the defining parameters of the calculation code are modified may require successive operations of determining the neutron flux values at the instrumented positions, while varying the defining parameters of the calculation code and while determining the modifications which minimize the differences with respect to the measurement values.

In this way the calculation code is reset.

Finally, a second on-line calculation of the instantaneous neutron flux distribution inside the core is carried out from the parameters originating from the power unit plant using the neutron flux calculation code which includes corrected defining parameters.

From this instantaneous neutron flux distribution, the values of the core operating parameters are determined and then transmitted via the line 36a to the comparison unit 37. An alarm is raised should any limiting value be exceeded, as described previously. Parameters originating from the power unit plant are obtained and transmitted to the computer in a relative short time, of around 2 seconds.

The neutron flux values in the various points of the core, which form the neutron flux bulk distribution, are calculated about every 30 seconds. To obtain a more accurate instantaneous value of the neutron flux bulk distribution in the core, it is possible to recalculate, approximately, using the instantaneous values of the parameters originating from the power unit plant, i.e. about every two seconds, the neutron flux values representing the instantaneous neutron flux bulk distribution in the nuclear reactor core. For this, the calculation code is used in a simplified way to modify the neutron flux values of the last bulk distribution calculated from the instantaneous values of the parameters originating from the power unit plant. In this way it is possible to obtain a f aster response in order to raise an alarm enabling a reduction in nuclear reactor power to be ordered.

The nuclear reactor protection, resulting in the emergency shutdown of the reactor in order to reduce the power to zero power, is ensured by a protection system which comprises six-section multistage ex-core chambers arranged outside the nuclear reactor vessel.

This protection system is calibrated using the RIC instrumentation system, once a month.

The invention is not strictly limited to the embodiment which has been described.

Thus it is possible to use a number of detectors other than 16 and generally a number of detectors which is less than about 15% of the number of fuel assemblies to determine the power distribution and the core operating parameters.

Instead of self-powered neutron detectors comprising a transmitter made of a rhodium-based material, it is possible to use self-powered neutron detectors comprising a transmitter made of a cobalt-based material or of some other material.

It would also be possible to use self-powered neutron detectors which ensure absorption of currents resulting from slow disintegration processes and which only provide currents resulting from fast processes. Such self-powered neutron detectors would mean that the use of an on-line measurement acceleration unit could be avoided.

The frequency of measurements and calculations leading to the core operating parameter or parameters being obtained can be set to a value less than one minute, within the framework of the invention.

The process and the device according to the invention are applicable to the monitoring of any nuclear reactor comprising a core formed by fuel assemblies into which it is possible to introduce internal flux measuring instrumentation.

What is claimed is:

1. A process for monitoring at least one operating parameter of a nuclear reactor core of a nuclear power station power unit, the core having a number of juxtaposed fuel assemblies arranged over the height of the core, the process comprising the steps:

introducing a plurality of detectors, each having a string of spaced stacked detector units, into at least some of the fuel assemblies of the core for measuring neutron flux, the detectors being fixed and distributed over the height of the core;

during operation of the nuclear reactor, at specified time intervals:

a) measuring the neutron bulk flux distribution using a maximum number of detectors being equal to 15% of the number of fuel assemblies;

b) employing a neutron flux calculation code in conjunction with measurements provided by the detectors to obtain an instantaneous neutron bulk flux distribution throughout the entire core in the form of a set of neutron flux values at points distributed throughout the core, c) calculating at least one core operating parameter from the instantaneous neutron bulk flux distribution; and d) raising an alarm if at least one operating parameter is outside a preselected range.

2. The monitoring process according to claim 1, together with the following steps to obtain the instantaneous neutron flux distribution throughout the entire core:

instantaneously calculating, on the reactor site, the bulk flux distribution inside the core, in the form of a set of neutron flux values at the various points distributed throughout the core, comprising a first sub-set of instrumented positions where the neutron flux measuring detectors are located and a second sub-set of non-instrumented positions, the instantaneously calculating being based on parameters originating from the power unit plant, using the neutron flux calculation code;

calculating, for each instrumented position, the difference between the flux values obtained by measurement and the corresponding values calculated from the parameters originating from the power unit plant;

extrapolating the corresponding differences for every non-instrumented position, from the differences relating to the instrumented positions;

algebraically adding the values of the instrumented and non-instrumented differences to the bulk flux distribution values obtained from the parameters originating from the power unit plant, to obtain the measured value of the bulk flux distribution for every point distributed throughout the core.

3. The monitoring process according to claim 1 together with the following steps to obtain the instantaneous neutron flux distribution throughout the core:

instantaneously calculating, on the reactor site, the neutron bulk flux distribution inside the core, in the form of a set of neutron flux values at the various points distributed throughout the core, comprising a set of instrumented positions where the neutron flux measurement detectors are located, the instantaneous calculating being based on parameters originating from the power unit plant, using the neutron flux calculation code;

calculating, for each instrumented position, the differences between the neutron flux values obtained by measurement and the corresponding values calculated from the parameters originating from the power unit plant;

the calculated differences being used to correct defining parameters of the neutron flux calculation code; and performing a second instantaneous calculation on the nuclear reactor site of the instantaneous neutron flux distribution inside the core based on the parameters originating from the power unit plant, using the neutron flux calculation code which includes corrected defining parameters.

4. The monitoring process according to claim 1 wherein the instantaneous values of the parameters coming from the power unit plant and current neutron flux values determined for every point in the core are used to calculate new instantaneous neutron flux values simply, using the calculation code.

5. The monitoring process according to claim 1 wherein, for a core containing a number of fuel assemblies approximating 200, fewer than 30 detectors are used.

6. The monitoring process according to claim 5 wherein, for a core containing 193 fuel assemblies, 16 detectors are used.

7. The monitoring process according to claim 1 wherein, the at least one operating parameter of the nuclear reactor core is chosen from the group of the following parameters: linear power density $P_{lin}$, critical heating ratio (CHR, or DNB ratio), axial power imbalance $PI_{ax}$, azimuthal power imbalance $PI_{az}$, and negative reactivity margin NRM.

8. The monitoring process according to claim 1, wherein conditioning processing of the measured signals from the detectors includes the steps of isolating, for each signal, an electric signal due to a phenomenon of fast electron production; and by applying an inverse transfer function, determining a neutron flux value from electric current isolated from the current signal.

9. The monitor process according to claim 1, wherein neutron flux measurements are obtained by reading outputs of the flux detectors at time intervals of less than one minute.

10. An apparatus for monitoring at least one operating parameter of a nuclear reactor core of a nuclear power station power unit, the core having a number of juxtaposed fuel assemblies arranged over the height of the core, the apparatus comprising:

a plurality of detectors, each having a string of spaced stacked detector units, located in at least some of the fuel assemblies of the core for measuring neutron flux, the detectors being fixed and distributed over the height of the core;

the maximum number of detectors being equal to 15% of the number of fuel assemblies;

means for conditioning signals from the detectors;

processing means for determining the power distribution in the core and the at least one core operating parameter;

means for comparing the at least one operating parameter with at least one predetermined limit and for generating an alarm signal if the limit is exceeded; and means for displaying the alarm signal.

11. The apparatus according to claim 10, wherein the neutron flux measurement detectors are self-powered neutron detectors.

12. The apparatus according to claim 11, wherein the self-powered neutron detectors comprise a transmitter made of a rhodium-based material.

* * * * *

UNITED STATES PATENT AND TRADEMARK OFFICE
CERTIFICATE OF CORRECTION

PATENT NO.     : 6,400,786 B1
DATED          : June 4, 2002
INVENTOR(S)    : Jean-Lucien Mourlevat et al.

It is certified that error appears in the above-identified patent and that said Letters Patent is hereby corrected as shown below:

<u>Title page,</u>
Item [75], in the second Inventors name, please delete "Lovedec" and insert -- Louedec. --

Signed and Sealed this

Third Day of December, 2002

JAMES E. ROGAN
*Director of the United States Patent and Trademark Office*